US006564517B1

(12) United States Patent
Hanssen

(10) Patent No.: US 6,564,517 B1
(45) Date of Patent: May 20, 2003

(54) HURRICANE-RESISTANT STORM WINDOW ASSEMBLY

(76) Inventor: Bradley Hanssen, 511 Wynnehurst St., Pensacola, FL (US) 32503

( * ) Notice: Subject to any disclaimer, the term of this patent is extended or adjusted under 35 U.S.C. 154(b) by 0 days.

(21) Appl. No.: 09/221,377

(22) Filed: Dec. 28, 1998

(51) Int. Cl.[7] .............................. E06B 3/68; E06B 5/10
(52) U.S. Cl. ................... 52/204.51; 52/202; 52/204.61; 52/786.11
(58) Field of Search ................. 52/786.1, 786.11, 52/202, 204.51, 204.61

(56) References Cited

U.S. PATENT DOCUMENTS 5,398,452 A * 3/1995 Schilde et al. ........ 52/786.11 X
5,560,149 A * 10/1996 Lafevre ............... 52/204.51 X
5,747,170 A * 5/1998 Von Alpen et al. .... 52/786.1 X
5,778,629 A * 7/1998 Howes ................... 52/786.11

* cited by examiner

Primary Examiner—Christopher T. Kent

(57) ABSTRACT

A hurricane-resistant storm window assembly including at least one window pane member which consists of a first lami-glass substrate which is substantially 9/32 of an inch (2.7 mm) thick; a second lami-glass substrate which is substantially 9/32 of an inch (2.7 mm) thick; and a vinyl layer which is substantially 0.060 of an inch laminating the first lami-glass substrate and the second lami-substrate together. A window frame surrounding an outer perimeter edge of the at least one window pane member.

13 Claims, 4 Drawing Sheets

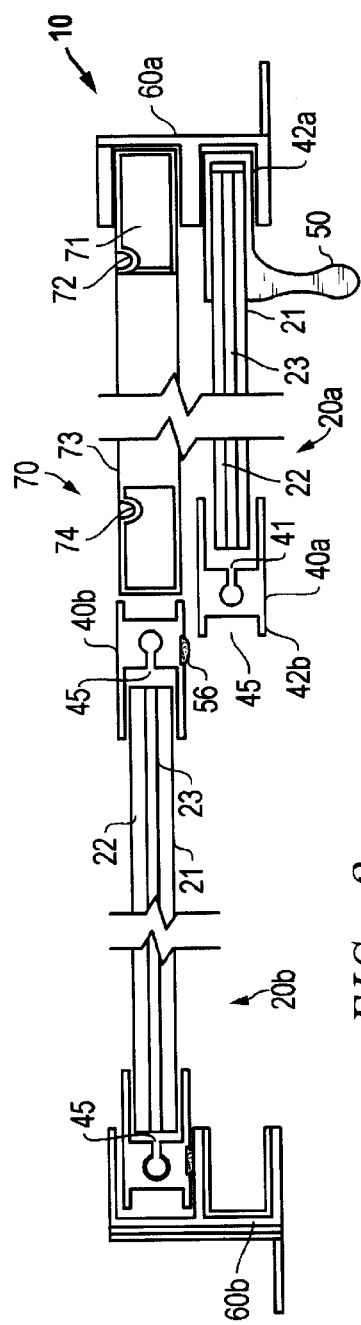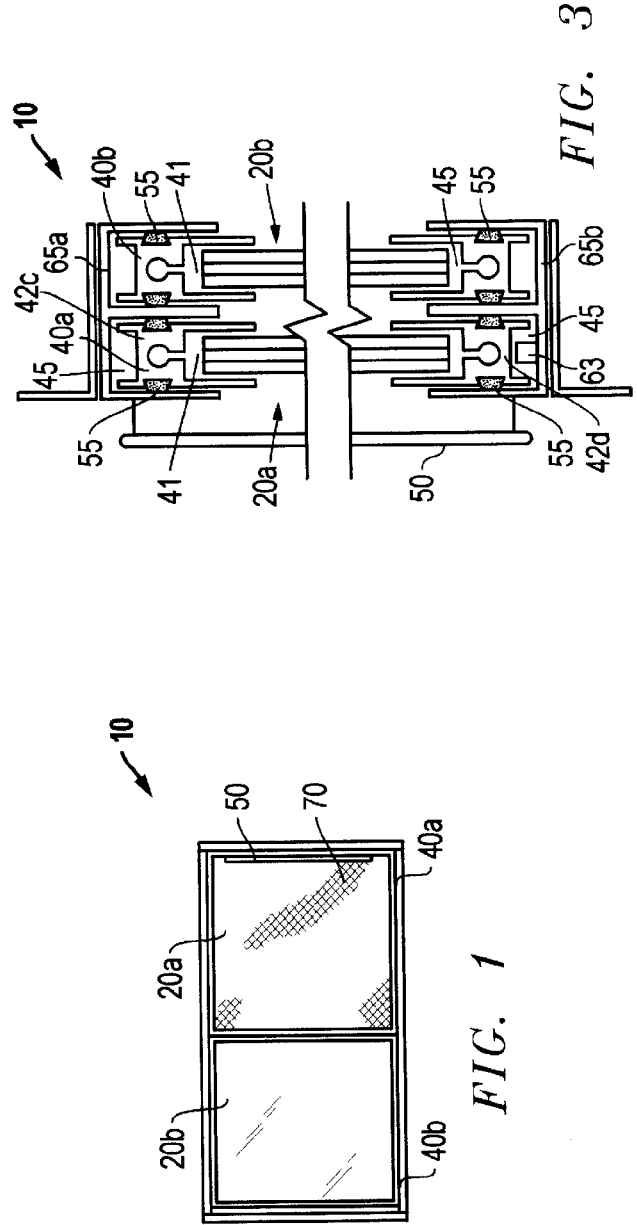

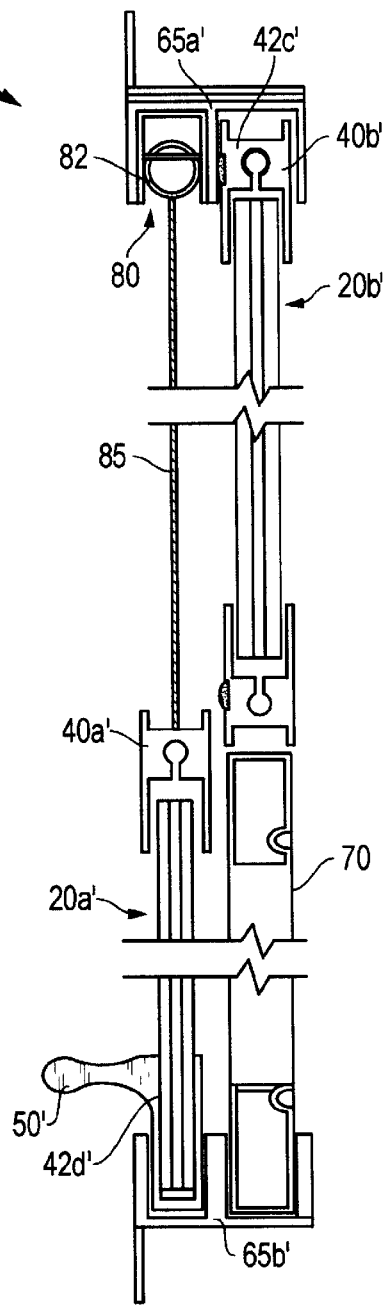
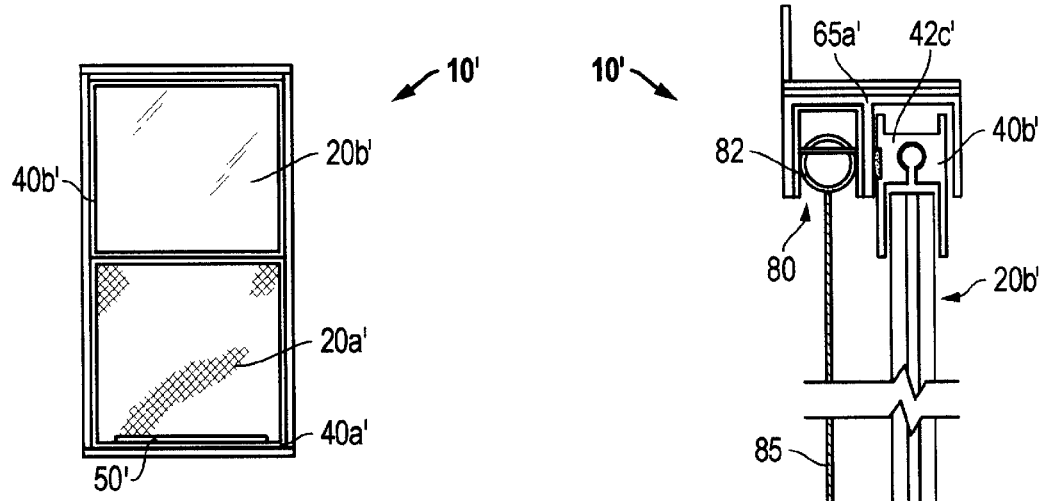
FIG. 4
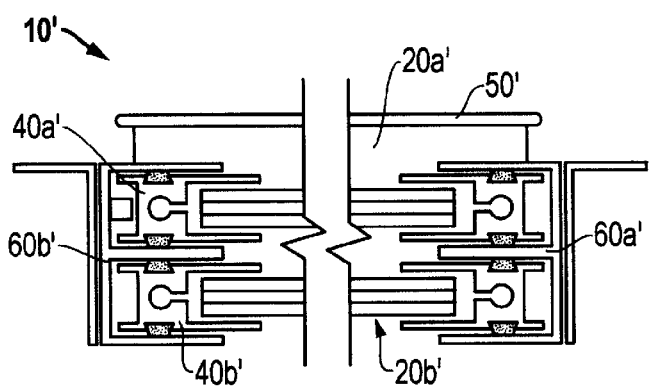
FIG. 6
FIG. 5

HURRICANE-RESISTANT STORM WINDOW ASSEMBLY

BACKGROUND OF THE INVENTION

1. Field of the Invention

The present invention relates to storm windows and, more particularly, to a hurricane-resistant storm window assembly which includes at least one window pane which is highly resistant to impact breakage, especially, during the bombardment of debris or other air-borne projectiles during a hurricane.

2. General Background

The need for high impact resistant windows or even bullet proof windows have long been felt. Several windows have been patented which are aimed at high impact resistant windows.

U.S. Pat. No. 5,713,167, issued to Durham et al., entitled "GLAZING SYSTEM" discloses a sliding glass door which includes a shatter-resistant transparent film secured to an inner face of a glass pane.

U.S. Pat. No. 5,398,452, issued to Schilde et al., entitled "SCREWED FIXING OF RETAINING OR FIXING MEMBER TO A LAMINATED GLAZING" and U.S. Pat. No. 4,985,099, issued to Mertens et al., entitled "PROCESS FOR INCREASING RESISTANCE TO PENETRATION THROUGH A GLAZED OPENING" disclose two glass substrates which are fastened by lamination with the aid of an interposed layer of thermoplastic material.

U.S. Pat. No. 4,321,777, issued to Sauret et al., entitled "COMPOSITE PANE HAVING A HIGH RESISTANCE TO IMPACTS" discloses a pane having at least one sheet of plastics material, for example a polycarbonate, which has a high resistance to impacts and is interposed between two sheets of glass or the like.

U.S. Pat. No. 4,228,425, issued to Cooke, entitled "TAMPER-PROOF TRANSPARENT SECURITY PLATE" discloses a pair of annealed glass plates laminated by a thin layer of plastic such as 0.060" layer of polyvinyl butyral.

Other patents in the art include U.S. Pat. Nos. 4,028,849 and 3,795,076, both issued to Anderson, which disclose window structures for use as single-hung window, a hopper window, or right or left-hand glider window and having a box frame and at least one movable sash. U.S. Pat. No. 3,992,817, issued to Hosooka, entitled "OUTER FRAME FOR DUAL SASH WINDOW ASSEMBLY" discloses a window assembly including a pair of sashes.

SUMMARY OF THE PRESENT INVENTION

The preferred embodiment of the storm window assembly of the present invention solves the aforementioned problems in a straight forward and simple manner. What is provided is a hurricane-resistant storm window assembly which includes at least one window pane member which is highly resistant to impact breakage, especially, during the bombardment of debris or other air-borne projectiles during a hurricane.

Broadly, the hurricane-resistant storm window assembly of the present invention comprises: at least one window pane member which consists of 1) a first lami-glass substrate which is substantially $\%_{32}$ of an inch (2.7 mm) thick; 2) a second lami-glass substrate which is substantially $\%_{32}$ of an inch (2.7 mm) thick; and, 3) a vinyl layer which is substantially 0.060 of an inch thick and laminating said first lami-glass substrate and said second lami-substrate together. Further included is a window frame surrounding an outer perimeter edge of said at least one window pane member.

In view of the above, it is an object of the present invention to provide a hurricane-resistant storm window assembly which 1) reduces heat and air condition loss; 2) is burglar resistant by virtue of the fact that the first and second window pane members are impact resistant; 3) minimizes outside ambient noise; 4) maximize sun ray deflection; and, 5) provides ultra violet protection.

Another object of the invention is to provide first and second window frames made of aluminum.

A further object of the present invention is to provide a hurricane-resistant storm window assembly which is aesthetically pleasing.

It is a still further object of the present invention to provide a hurricane-resistant storm window assembly which is adapted for at least single hung design type and right to left-hand glide design type.

It is a still further object of the present invention to provide a hurricane-resistant storm window assembly that can be opened at the sash so that if a structure fire occurs the occupants can exit the structure through the window.

It is a still further object of the present invention to provide a hurricane-resistant storm window assembly that is installed over the existing window with little attachment space necessary.

In view of the above objects, it is a feature of the present invention to provide a hurricane-resistant storm window assembly which is easy to install.

Another feature of the present invention is to provide a hurricane-resistant storm window assembly which is relatively simple structurally and thus simple to manufacture.

Another feature of the present invention is to provide a hurricane-resistant storm window assembly which is also burglar resistant.

Another feature of the present invention is to provide a hurricane-resistant storm window assembly which is has an inside lock to prevent unauthorized entry.

The above and other objects and features of the present invention will become apparent from the drawings, the description given herein, and the appended claims.

BRIEF DESCRIPTION OF THE DRAWINGS

For a further understanding of the nature and objects of the present invention, reference should be had to the following description taken in conjunction with the accompanying drawings in which like parts are given like reference numerals and, wherein:

FIG. 1 illustrates a front view of the hurricane-resistant storm window assembly of the right to left-hand glider type of the present invention;

FIG. 2 illustrates a top view of the hurricane-resistant storm window assembly of the right to left-hand glider of the present invention;

FIG. 3 illustrates a side view of the hurricane-resistant storm window assembly of the right to left-hand glider type of the present invention;

FIG. 4 illustrates a front view of the hurricane-resistant storm window assembly of the single-hung type of the present invention;

FIG. 5 illustrates a side view of the hurricane-resistant storm window assembly of the single-hung type of the present invention;

FIG. 6 illustrates a top view of the hurricane-resistant storm window assembly of the single-hung of the present invention;

DETAILED DESCRIPTION OF THE PREFERRED EMBODIMENT

Figure 7:
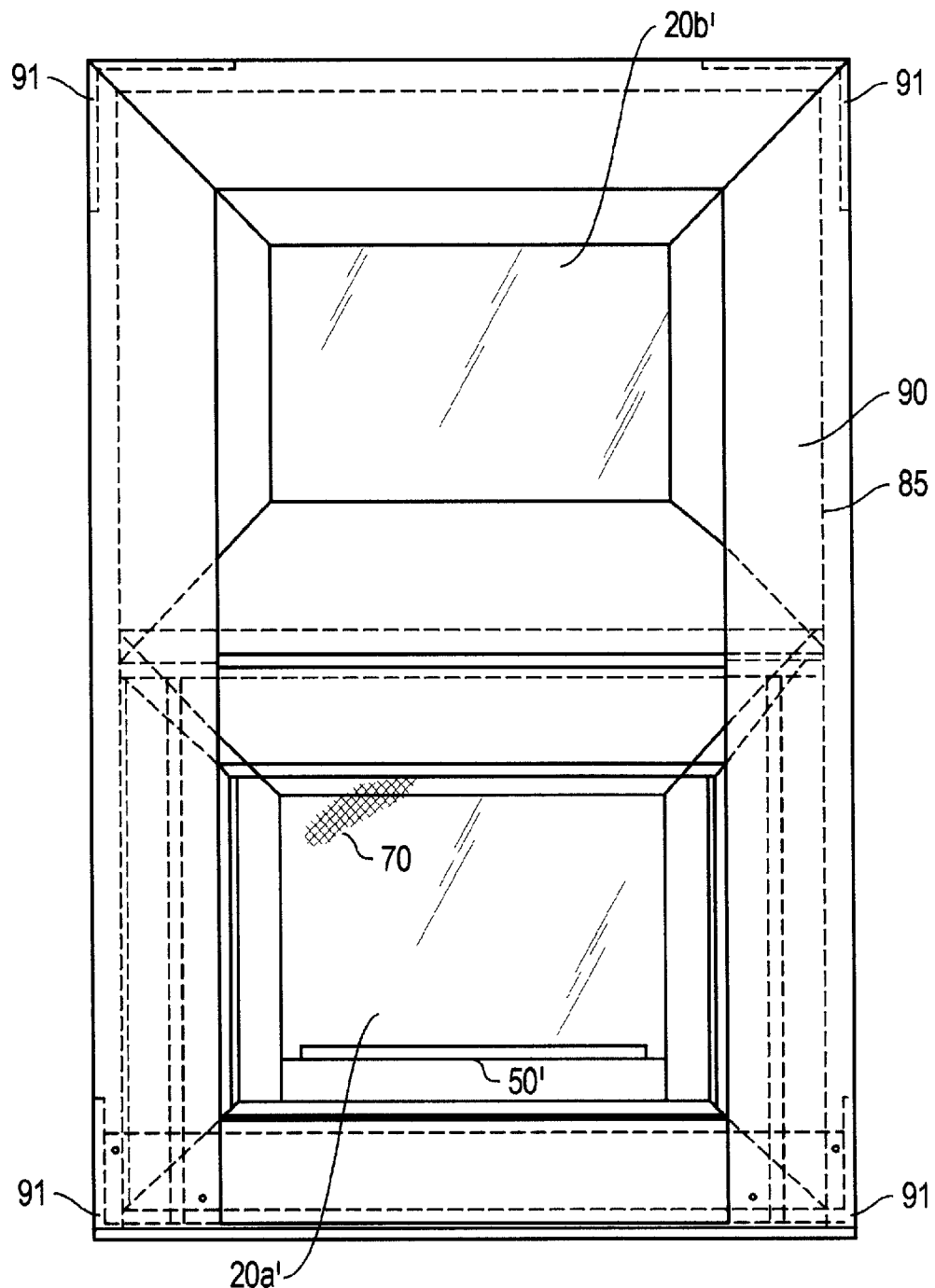
FIG. 7 illustrates an outside view of the hurricane-resistant storm window assembly of the single-hung type of the present invention; and, FIG 8 illustrates a side view of an alternate embodiment of the hurricane-resistant storm window assembly of the single-hung type of the present invention.

Referring now to the drawing, and in particular FIGS. 1–3, the hurricane-resistant storm window assembly of the present invention is designated generally by the numeral 10. Hurricane-resistant storm window assembly 10 is a right to left-hand glider type and is generally comprised of first impact-resistant window pane member 20a, second impact-resistant window pane member 20b, first and second impact-resistant window frame members 40a and 40b and handle member 50.

First and second window pane members 20a and 20b each consist of first lami-glass substrate 21 which is substantially 9/32 of an inch (2.7 mm) thick and second lami-glass substrate 22 which is likewise substantially 9/32 of an inch (2.7 mm) thick. First lami-glass substrate 21 and second lami-glass substrate 22 are laminated together via vinyl layer 23 which is substantially 0.060 of an inch polyvinyl wherein such vinyl layer 23 provides impact resistance, as well as, ultra violet protection. The thickness of first and second lami-glass substrates 21 and 22 and the vinyl layer 23 creates an S.T.C. (Sound Transit Control) rating of 37 for sound proofing.

The outer perimeter edge of first window pane member 20a is surrounded by first window frame 40a and the outer perimeter edge of second window pane member 20b is surrounded by second window frame 40b. The first window pane member 20a in combination with first window frame 40a define a first window portion. The second window pane member 20b in combination with second window frame 40b define a second window portion.

First window frame 40a is a border frame defining a border channel 41 which receives therein the outer perimeter edge of first window pane 20a. The outer perimeter edge of first window pane member 20a is secured in border channel 41 via a conventional securing and sealing means, such as commercially available DOW CORNING SILICONE #1199. A right side portion 42a of the border frame has handle member 50 forwardly projecting therefrom. In the preferred embodiment, handle member 50 extends a significant portion of the length of the right side portion 42a of the border frame.

Right and left side portions 42a and 42b of the border frame are slidably coupled between right and left window jamb channel members 60a and 60b, respectively. In the preferred embodiment, right and left window jamb channel members 60a and 60b are each generally "M" shaped defining a forward channel and a rear channel. The right side portion 42a of the border frame is dimensioned to fit in the forward channel of window jamb channel member 60a wherein hurricane-resistant storm window assembly 10 is in a closed state when right side portion 42a is fully received in the forward channel of right window jamb channel member 60a. On the other hand, left side portion 42b is adapted to be slidably received in the forward channel of left window jamb channel member 60b as the first window pane member 20a is slid left. When right side portion 42a is slid out of the forward channel of right window jamb channel member 60a the hurricane-resistant storm window assembly 10 is in an open state.

As can be appreciated in lieu of a right to left-hand glide type design a left to right-hand glide type design may be substituted.

The left side, top and bottom portions 42b, 42c and 42d of the boarder frame of the first window member 20a include shallow channel 45 opposite the border channel 41 wherein shallow channel 45 receives therein guide member 63 fixedly secured in the center of the forward channel of bottom window jamb channel member 65b. The front and back exterior surfaces of the top, bottom and left side portions 42b, 42c and 42d included weatherstrips 55.

Right side portion 42a differs from left side portion 42b in that shallow channel 45 has been omitted. Furthermore, the border channel 41 is deeper to provide the necessary surface for the integration of handle member 50 therewith.

Top and bottom window jamb channel members 65a and 65b are generally "M" shaped and serve to maintain said first window portion and said second window portion aligned. Top portion 42c and bottom portion 42d of the border frame of first window pane member 20a are slidably received in the forward channel of top and bottom window jamb channel members 65a and 65b.

Second window frame 40b is a border frame defining a border channel 45 which receives therein the outer perimeter edge of second window pane member 20b. The outer perimeter edge of second window pane member 20b is secured in border channel 45 via a conventional securing and sealing means. Left side portion 46b of the border frame is fixedly secured and sealed in the rear channel of left window jamb channel member 60b. Right side portion 46a of the border frame includes a weatherstrip member 56 for sealing first window frame 40a and second window frame 40b therealong. Moreover, second window frame 40b is fixedly secured in top and bottom window jamb channel members 65a and 65b.

In the preferred embodiment, first window frame 40a, second window frame 40b, right and left window jamb channel members 60a and 60b and top and bottom window jamb channel members 65a and 65b are made of aluminum.

Storm window assembly 10 further includes screen member 70 which is adapted to be secured along the rear of said first window portion. Thereby, when said first window portion is slid to the left, screen member 70 provides a barrier. Screen member 70 includes screen frame 71 having border notch 72 formed therein and screen mesh 73. Screen mesh 73 is secured to screen frame 71 via resilient cord 74 friction fit coupled in border notch 72.

Regarding FIGS. 4–7, hurricane-resistant storm window assembly 10' of the single hung type is shown. Hurricane-resistant storm window assembly 10' of the single hung type differs in that in lieu of first and second window members 20a and 20b being generally side-by-side, first and second window pane members 20a' and 20b' are vertically stacked above one another. In other words, first window pane member 20a' is hung via a sash balance cord 85 and second window pane member 20b' is fixedly secured.

In general, hurricane-resistant storm window assembly 10 has been essentially rotated 90 degrees. Thus, handle member 50' is horizontally disposed along the bottom portion 42d' of first window frame 40a'. Thus, when the first window portion defined by first window pane member 20a' surrounded by first window frame 40a' is lifted out of the forward channel of bottom window jamb channel member 65b', hurricane-resistant storm window assembly 10' is in an open state.

Second window portion defined by second window pane member 20b' surrounded by second window frame 40b' is fixedly secured in top window jamb channel member 65a' wherein the top portion 42c' of the second window frame 40b', is fixedly secured in the rear channel of top window jamb channel member 65a'.

Hurricane-resistant storm window assembly 10' further includes overhead balance mechanism 80 including sash balancer 82 and sash balance cord 85. Sash balancer 82 is secured in the forward channel of top window jamb channel member 65a'. Sash balance cord 85 is hung in the forward channel of at least one of right or left window jamb channel members 60a' or 60b' and has a free end secured to first window frame 40a'. In the preferred embodiment, overhead balance mechanism 80 is a 62W series overhead balance by Stry-Buc Industries (Enclosure (1)).

Referring now to FIG. 7, an outside view of hurricane-resistant storm window assembly 10' is shown. The exterior of hurricane-resistant storm window assembly 10' includes mainframe 90 and angle corner clips 91.

Figure 8:
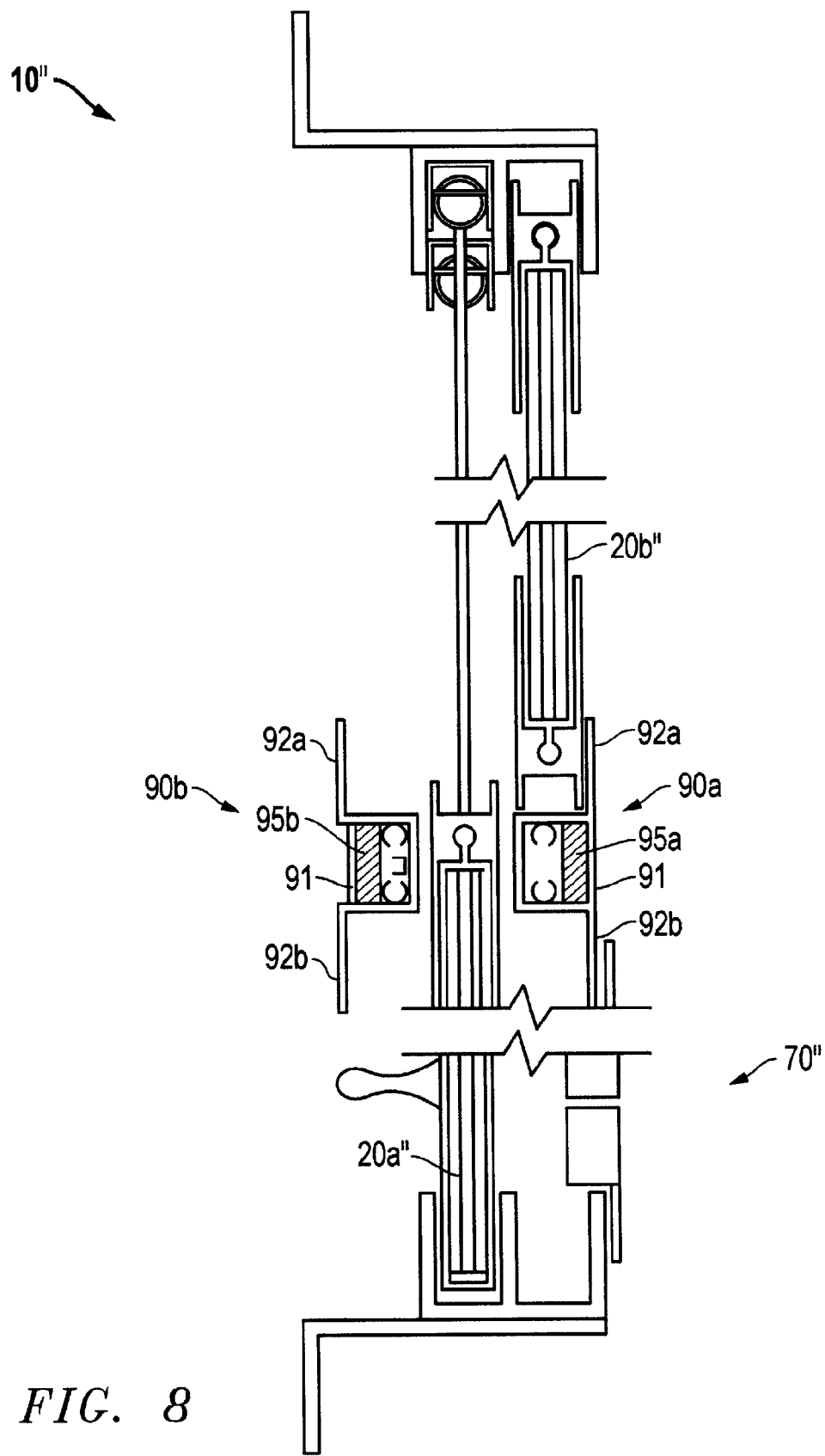

Referring now to FIG. 8, an alternate embodiment of the hurricane-resistant storm window assembly of the single hung type is shown. Hurricane-resistant storm window assembly 10" of the single hung type differs from the embodiment of FIGS. 4–7 in that first and second center mullions 90a and 90b are provided and screen member 70" is of a flange type.

First and second center mullions 90a and 90b each includes fixed crossbar member 91. Fixed crossbar member 91 is a generally square shaped tubular cavity extending horizontally from side-to-side. Projecting from the fixed crossbar member 91 there is provided top and bottom flanges 92a and 92b, respectively. Forwardly disposed in the tubular cavities of first and second center mullions 90a and 90b are steel bar members 95a and 95b, respectively. Center mullions 90 will, therefore, withstand being hit by a flying object.

The primary difference between first and second center mullions 90a and 90b is that fixed crossbar member 91 of first center mullion 90a is recessed from the vertical plane of flanges 92a and 92b. First center mullion 90a is in close proximity to a bottom portion of second window pane member 20a" and second center mullion 90b is in close proximity to a top portion of first window pane member 20a".

Advantages of hurricane-resistant storm window assemblies 10, 10', and 10" include 1) reduced heat and air condition loss; 2) burglar resistance by virtue of the fact that the first and second window pane members 20a and 20b are impact resistant; 3) minimized outside ambient noise; 4) maximized sun ray deflection; and, 5) ultra violet protection.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A hurricane-resistant storm window assembly comprising:
    (a) at least one window pane member which consists of:
        (i) a first lami-glass substrate which is substantially 9/32 of an inch (2.7 mm) thick,
        (ii) a second lami-glass substrate which is substantially 9/32 of an inch (2.7 mm) thick, and
        (iii) a vinyl layer which is substantially 0.060 of an inch thick and laminating said first lami-glass substrate and said second lami-substrate together,
    said at least one window pane member including a first window pane member and a second window pane member vertically stacked and wherein said second window pane member is fixedly secured and said first window pane member is slidably coupled to transition from a closed state to an open state as said first window pane member is lifted;
    (b) a window frame surrounding an outer perimeter edge of said at least one window pane member; and,
    (c) first and second center mullions each of which includes:
        (i) a fixed crossbar member which is a generally square shaped tubular cavity extending horizontally;
        (ii) top and bottom flanges projecting from a top of said fixed crossbar member and from a bottom of said fixed crossbar member; and,
        (iii) steel bar members disposed in said fixed crossbar member wherein said first center mullion is in close proximity to a bottom portion of said second window pane member and said second center mullion is in close proximity to a top portion of said first window pane member.

2. The apparatus of claim 1, wherein said vinyl layer provides impact resistance, as well as, ultra violet protection.

3. The apparatus of claim 2, wherein a total thickness of said first and second lami-glass substrates and said vinyl layer creates a means for sound proofing.

4. The apparatus of claim 1, wherein said at least one window pane member includes a first window pane member and a second window pane member positioned side-by-side and wherein said second window pane member is fixedly secured and said first window pane member is slidably coupled to transition from a closed state to an open state from right to left or from left to right.

5. The apparatus of claim 1, further comprising a overhead balancer having a balanced sash cord.

6. The apparatus of claim 1, further comprising a screen member rearward disposed behind said first window pane member.

7. A hurricane-resistant storm window assembly comprising:
    (a) first and second window pane members each of which consists of:
        (i) a first lami-glass substrate which is substantially 9/32 of an inch (2.7 mm) thick,
        (ii) second lami-glass substrate which is substantially 9/32 of an inch (2.7 mm) thick,
        (iii) a vinyl layer which is substantially 0.060 of an inch thick and laminating said first lami-glass substrate and said second lami-substrate together;
    (b) a first window frame surrounding an outer perimeter edge of said first window pane member;
    (c) a second window frame surrounding an outer perimeter edge of said second window pane member and
    (d) first and second center mullions each of which includes:
        (i) a fixed crossbar member which is a generally square shaped tubular cavity extending horizontally;
        (ii) top and bottom flanges projecting from a top of said fixed crossbar member and from a bottom of said fixed crossbar member; and,
        (iii) steel bar members disposed in said fixed crossbar member wherein said first center mullion is in close proximity to a bottom portion of said second window pane member and said second center mullion is in close proximity to a top portion of said first window pane member.

8. The apparatus of claim 7, wherein said vinyl layer provides impact resistance, as well as, ultra violet protection.

9. The apparatus of claim 8, wherein a total thickness of said first and second lami-glass substrates and said vinyl layer creates a means for sound proofing.

10. The apparatus of claim 7, wherein said first window pane member and said second window pane member are positioned side-by-side and wherein said second window pane member is fixedly secured and said first window pane member is slidably coupled to transition from a closed state to an open state from right to left or from left to right.

11. The apparatus of claim 7, wherein said first window pane member and said second window pane member are vertically stacked and wherein said second window pane member is fixedly secured and said first window pane member is slidably coupled to transition from a closed state to an open state as said first window pane member is lifted.

12. The apparatus of claim 11, further comprising a overhead balancer having a balanced sash cord.

13. The apparatus of claim 11, further comprising a screen member rearward disposed behind said first window pane member.

* * * * *